(12) United States Patent
Kim

(10) Patent No.: US 8,386,157 B2
(45) Date of Patent: Feb. 26, 2013

(54) UNIVERSAL GPS TRAFFIC MONITORING SYSTEM

(76) Inventor: Jin Hong Kim, Mercer Island, WA (US)

( * ) Notice: Subject to any disclaimer, the term of this patent is extended or adjusted under 35 U.S.C. 154(b) by 558 days.

(21) Appl. No.: 12/578,550

(22) Filed: Oct. 13, 2009

(65) Prior Publication Data

US 2010/0100307 A1   Apr. 22, 2010

Related U.S. Application Data

(60) Provisional application No. 61/104,694, filed on Oct. 10, 2008, provisional application No. 61/166,716, filed on Apr. 4, 2009.

(51) Int. Cl.
*G01C 21/00* (2006.01)
(52) U.S. Cl. .................. 701/119; 340/995.13
(58) Field of Classification Search .......... 701/117–119; 340/995.13, 995.1, 995.14
See application file for complete search history.

(56) References Cited

U.S. PATENT DOCUMENTS

| | | | | |
|---|---|---|---|---|
| 7,269,503 B2 * | 9/2007 | McGrath | ....................... | 701/117 |
| 7,696,866 B2 * | 4/2010 | Horvitz | ....................... | 340/507 |
| 2009/0271101 A1 * | 10/2009 | Relyea et al. | ................. | 701/118 |

* cited by examiner

*Primary Examiner* — Dalena Tran
(74) *Attorney, Agent, or Firm* — Dean A. Craine

(57) ABSTRACT

A universal GPS traffic monitoring system that uses a plurality of GPS enabled mobile devices to transmit near real-time traffic direction and speed information to a server. The sever processes the information thereby reducing the computational load and power consumption of the mobile devices. The system uses a Traffic Pattern Recognition software program that recognizes only valid traffic data while filtering out unwanted traffic data. The system creates a Distributed Traffic Data Store database containing the average speeds for designated traffic monitoring points (TMPs) created for the region. A request for traffic data containing the boundary data and the zoom level is sent from the mobile device to the server. The server reviews the request and determines which specific Distributed Traffic Data Store database contains the information and then creates and sends a compressed file containing the traffic information relevant to the TMPs in the request to the mobile device.

11 Claims, 10 Drawing Sheets

UNIVERSAL GPS TRAFFIC MONITORING SYSTEM

This utility patent is based on can claims the filing date of U.S. Provisional Patent Application, filed on Oct. 10, 2008, (Ser. No. 61/104,694) and U.S. Provisional Patent Application filed on Apr. 4, 2009 (Ser. No. 61/166,716).

BACKGROUND OF THE INVENTION

1. Field of the Invention

The present disclosure relates to monitoring traffic data, and more particularly to aggregating traffic data from Global Positioning System ("GPS") enabled mobile devices.

2. Description of the Related Art

Currently, traffic-monitoring systems act more as blunt instruments, than as precision tools. For example, what appears to be gridlock on a traffic monitoring system may have completely vanished by the time a driver arrives; other times, a driver may head straight into a traffic jam without receiving any alert.

In some cases, such shortcomings may arise at least in part because there may not be a single source of reliable live traffic information. Therefore, current traffic monitoring services often have to collect their own traffic data from a range of sources of varying accuracy. Sources of traffic data may include construction alerts from municipalities, incident reports from police departments about events like accidents and parades, and traffic volume data from governmental transportation agencies. For example, a state Department of Transportation ("DOT") may use periodic updates from traffic cameras and loop sensors embedded in roads to judge how traffic is moving.

However, each of these sources of traffic information may have inherent limitations. For example, construction alerts are often out of date, and incident reports are often delayed. Moreover, data from loop sensors may take time to calculate, and more sophisticated sensors cover only a fraction of the nation's roads.

In some cases, DOT may make traffic data available to public. However, DOT-provided traffic data is often delayed by up to thirty or more minutes. Accordingly, DOT-provided data often does not provide up-to-the-second, truly local traffic information. Some private companies may also collect traffic data, often using roadside radar sensors with cellular radios to transmit real-time speed information to regional offices.

Traffic data from sources such as those described above may not provide accurate and detailed information about traffic from mile to mile. For example, many traffic monitoring systems may only provide a gross level of detail. For example, many current systems may display traffic data with a few different colors to show traffic status (e.g., green, yellow, red, and black). In addition, the length of a traffic-report roadway segment may be miles long, with only a single "color" applied to the entire segment. In many cases, current traffic monitoring systems may not provide enough detail to allow drivers to accurately determine alternative routes around a traffic obstruction.

In some cases, current traffic information systems may use data from one or more GPS-enabled mobile devices. However, current systems may require mobile devices to download "virtual trip line" data. "Virtual trip lines" ("VTL") are geographical markers that define certain geographic locations, such that whenever a participating device passes through the trip line, information is relayed to the traffic information collection servers. Thus, a GPS-enabled mobile device is generally required to download and cache VTL data. Furthermore, a mobile device must frequently determine whether it has traversed a VTL, so that it knows whether to send measurements to a traffic information collection server. To determine trip line traversals, a mobile device must check if the line between the current GPS position and a previous GPS position intersects with any of the VTL in its cache. This calculation generally imposes significant computational overhead and may decrease battery life, often significantly. In addition, virtual trip line systems by their very nature may have difficulty providing detailed traffic information about relatively short road segments (as they only collect data when a mobile device passes a virtual trip line).

In sum, many current traffic monitoring systems have some or all of the following limitations:

Traffic sensors are fixed in place;
Expensive;
Time delayed;
Limited to primary roads (e.g., primarily main highways, with little or no coverage for secondary and tertiary roads); and,
Provide only a gross level of detail;

SUMMARY OF THE INVENTION

A traffic data collection process and monitoring system that uses a plurality of GPS enabled mobile devices to intermittently or continuously transmit near at real-time traffic speed, direction and location information to a server. The sever processes and transforms the information from a plurality of mobile devices and the saves it in a database containing a plurality of pre-designated traffic monitoring points in the region. The speeds from a plurality of mobile devices for a particular traffic monitoring point (called TMPs) are transformed and averaged. Because the processing is done on the server, the computational load and power consumption of the mobile devices is reduced.

The system includes a server with a Traffic Pattern Recognition software program (called TPR) loaded into its working memory. In addition to collecting the speed and location data from the mobile devices, the TPR also further transforms the data to sort out valid traffic data from invalid traffic data. When the speed/location data is sent from the mobile devices to the server, the TPR builds a Distributed Traffic Data Store database containing the average speeds for designated TMPs created for the region. The time intervals for sending the speed/location data from the mobile device to the server is determined by either the mobile device (a default setting) or by the server. During use, the time interval for sending the speed location data may be adjusted.

During use, traffic information is continuously or intermittently download from the sever to the mobile device. The request contains the boundary data information and the zoom level information. The information is then further processed and used to instruct the server which Distribution Traffic Data Store database should be used and which TMPs average speeds should be transmitted. The zoom level information instructs the server on how many TMPs average speeds are collected. When more than one traffic data is sent from mobile devices for the same TMP location, the server then calculates the average speeds using the traffic data for the TMP and transmits it in a compressed format to the mobile device.

Some features of the system include: (1) the location of the TMP database on the server that contains a plurality of pre-determined TMPS in the region where traffic is to be monitored; (2) during use, the speed and location data from each mobile device is uploaded to the server which then associates the speed data with a particular TMP in the Distribution Traffic Data Store database; (3) when sending a traffic data request to the server, only the boundary and zoom level data is sent (an optional filter may be sent); (4) during transmission of the traffic information, a compressed format is used.

DESCRIPTION OF THE EMBODIMENT(S)

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the Figs. While embodiments are described in connection with the Figs. and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

The system 100 is designed to efficiently aggregate real-time or near real-time traffic data from a plurality of mobile devices 105 operating a traffic region 102. The system 100 may provide detailed traffic information accurate to segments as short as a couple of hundred feet. In addition, the system 100 may provide up-to-date information about highways, downtown local streets, and/or other local streets all based upon traffic data uploaded and aggregated from individual GPS enabled mobile devices 105 operating in the region 102.

The system 100 includes the following features: (') accurate, real-time speed, location and directional data from GPS-enabled mobile devices; (2) calculates the accurate current speed of traffic for each roadway in a region 102 where a corresponding data map containing traffic monitoring points have been established; (3) collects and aggregates speed/location data from thousands of mobile phones operating in the region 102 and then processes the data for delivery back to mobile devices 105 or the desktop computers 110; (4) can be scaled quickly so that a large map of a region 102, such as the City of Seattle, so that the system 100 may be ready for used in less than a week, and (5) provides for anonymity so that traffic data from the mobile devices is collected anonymously and without effort or constant input from the user's.

Figure 1:
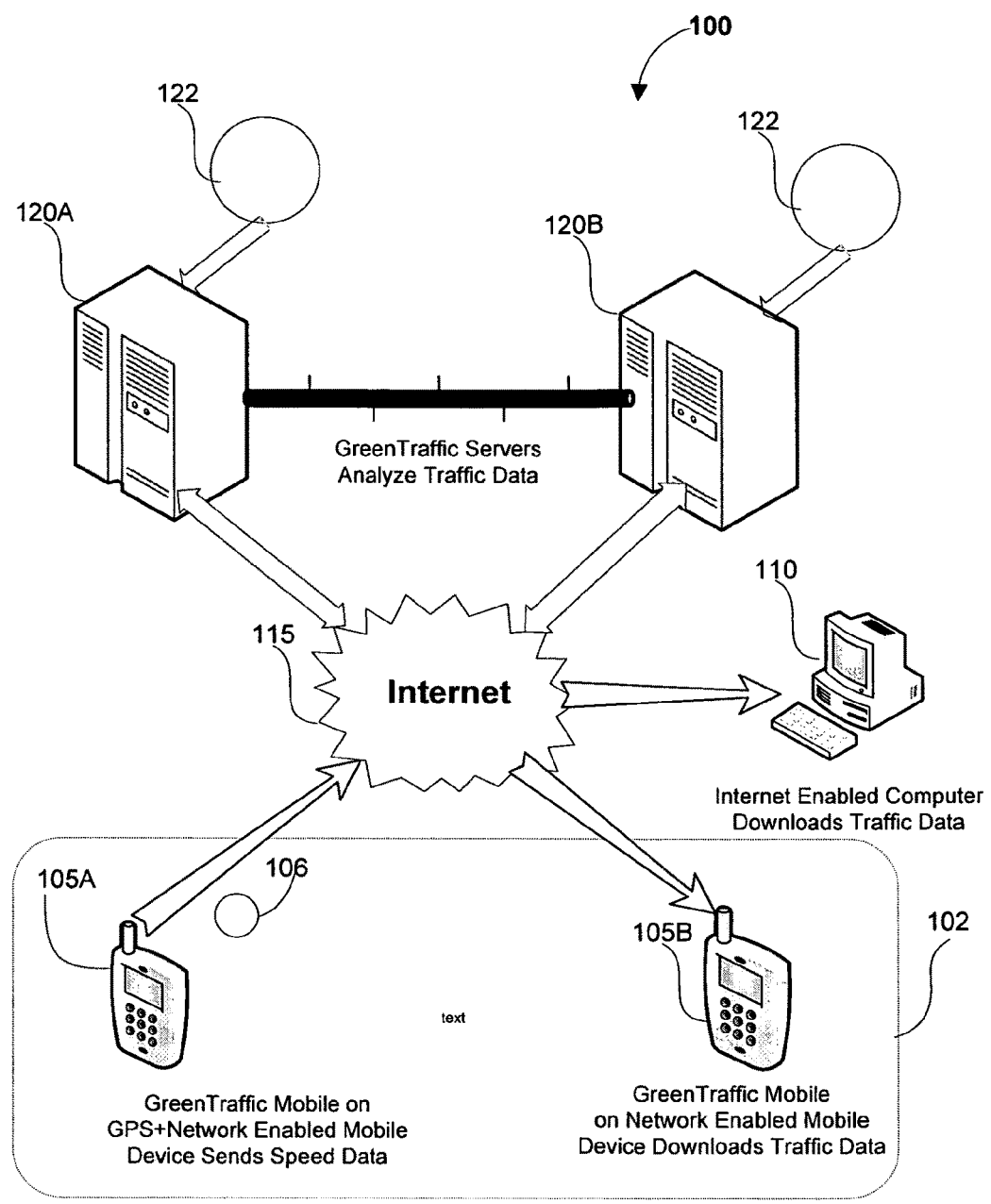
FIG. 1 is a system diagram of a number of devices in a network in accordance with one embodiment.

As illustrated in FIG. 1, system 100 uses a plurality of GPS- and network-enabled mobile devices 105A-B to anonymously collect speed, location and direction data (hereinafter referred to as 'speed/location data 106) from mobile devices 105 operated in motor vehicles operated in a region 102. The GPS- and network-enabled mobile devices 105 may comprise a GPS enabled mobile phone, a portable GPS device, a GPS device permanently mounted in a motor, a portable computer or vehicle, and the like. Each mobile device 105 must be able to wirelessly connect to a wireless communication network operated in the traffic region 102 and coupled to wired communication network, such as the Internet 115.

System 100 also includes one or more backend servers 120A-B used to process the speed/location data 106 from the mobile devices 105A-B. The servers 120A-B are connected directed or linked to the network 115 used by the mobile devices 105A-B. In FIG. 1, the wireless communication network and wired communication network is depicted as network 115. The servers 120A-b may also be connected directly or linked to other traffic data collecting devices or services.

The system 100 is specifically designed to eliminate the requirement of downloading and storing virtual trip line data commonly used by traffic collection and monitoring systems in the prior art. The system 100 does not require the performance of frequent calculations to detect VTL Traversal. Rather, the system 100 requires that mobile devices 105 merely send speed/location data 106 to a backend server 120 at predetermined time intervals. The predetermined time intervals may be setup as default time intervals on the mobile device 105 so the mobile devices 105 automatically transmit speed/location data 106 continuously or at selected time periods. The system 100 may also be setup so that the server 120 transmits instructions to the mobile devices 105 the time interval to be used to upload the speed/location data 106.

Figure 2:
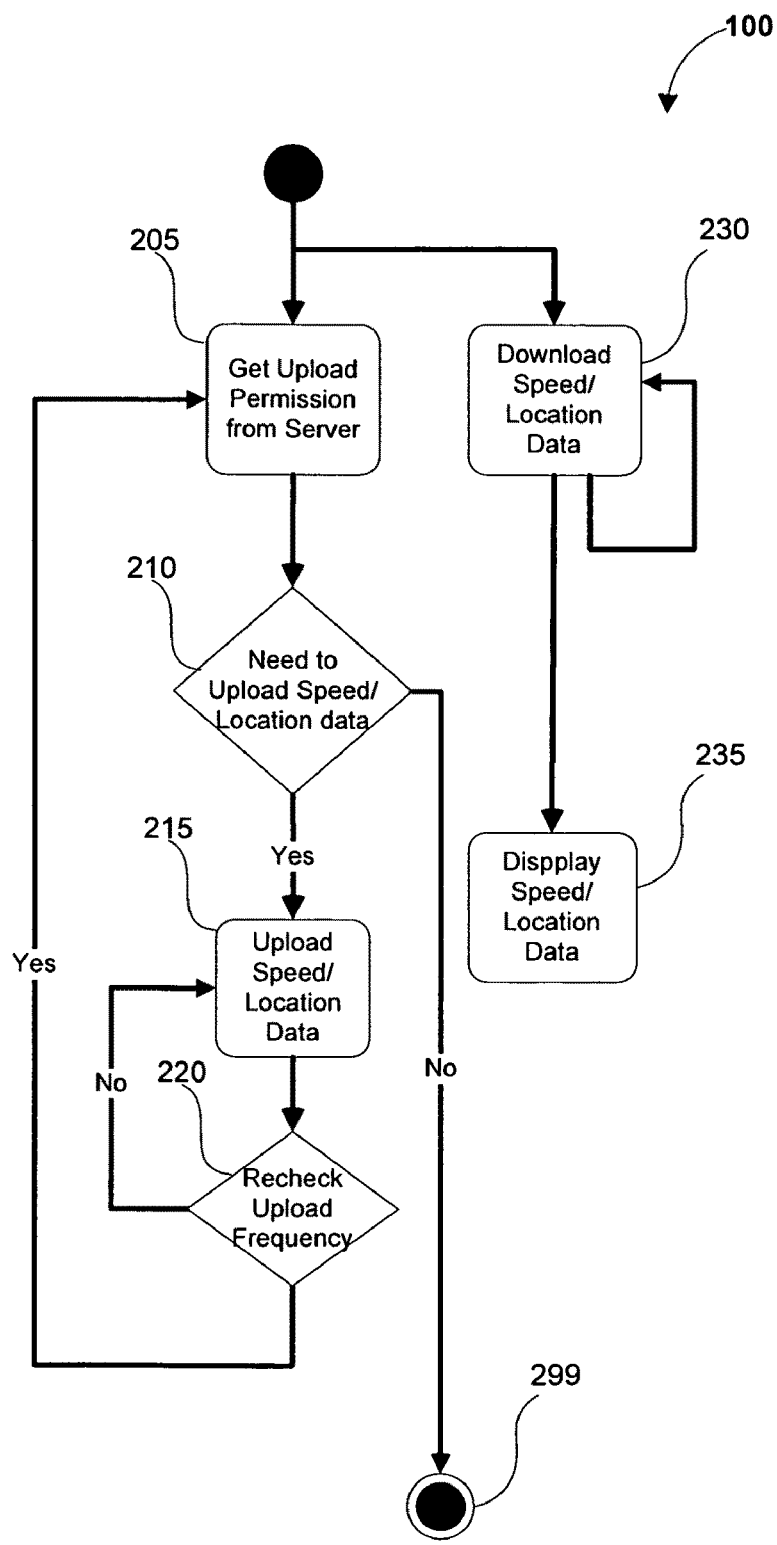
FIG. 2 is a flow diagram of a traffic data upload and download routine in accordance with one embodiment.
Figure 3:
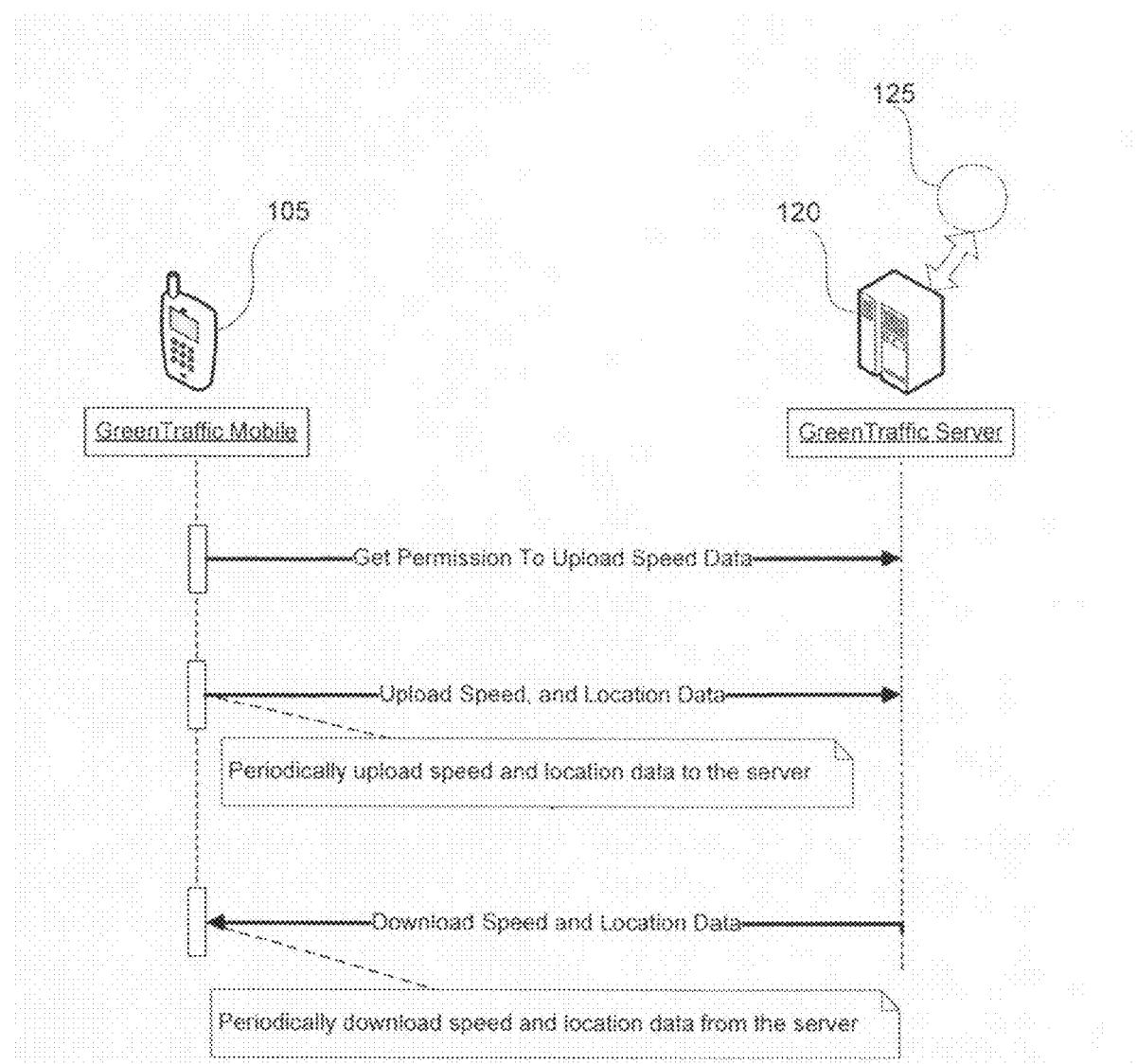
FIG. 3 illustrates data flow between a mobile device and a server during a traffic data upload and download routine in accordance with one embodiment.
Figure 10:
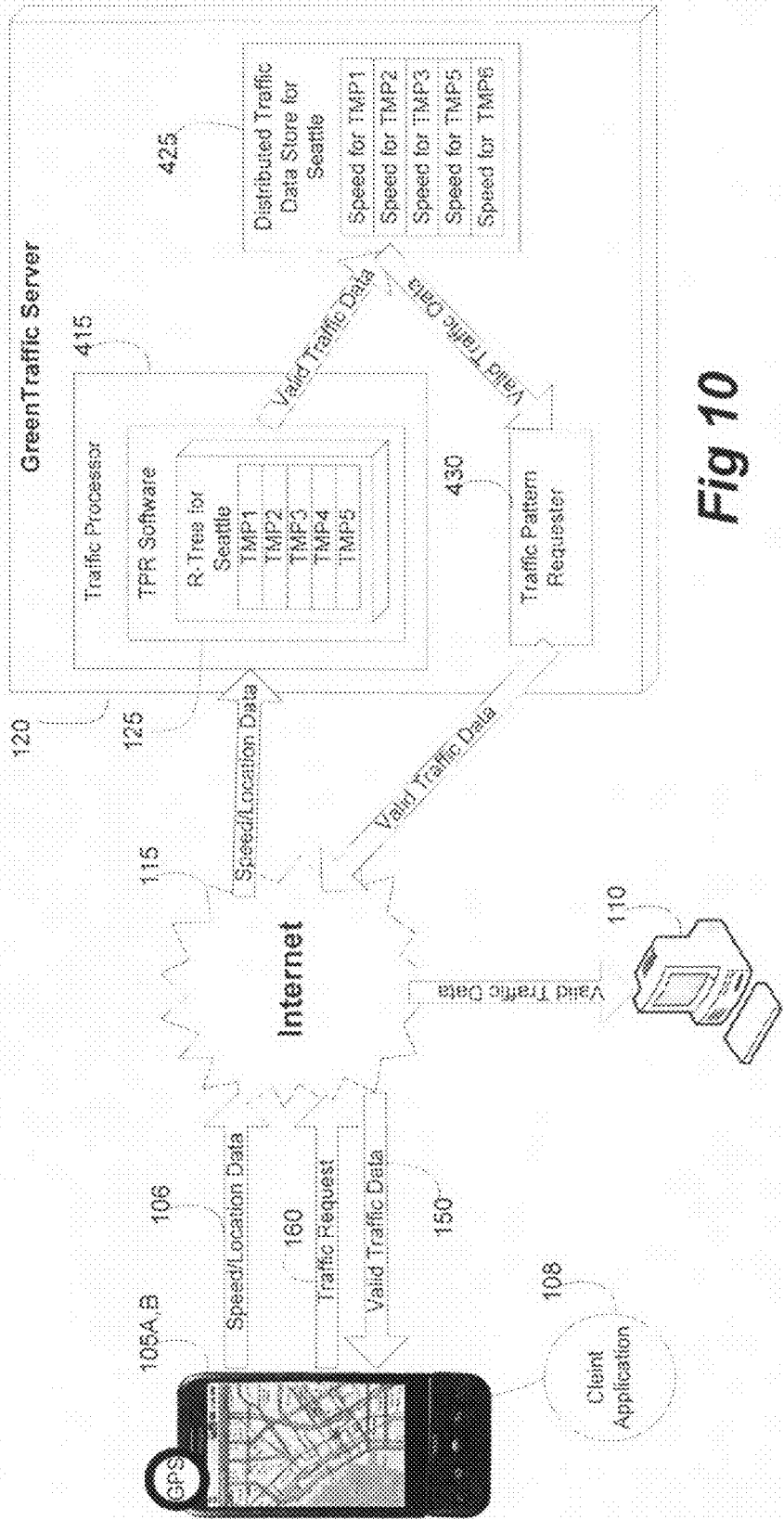
FIG. 10 is an illustration of the entire system.

FIG. 2 is a simple block diagram showing how the system 100 collects and distributes the speed/location data 106. As shown in FIG. 10, during setup, a new user first downloads a system client application 108 in his or her GPS-enabled mobile device 105. The client application 108 may be relatively small, as it does not require a VTL data cache, and it may place a relatively light load on the mobile device 105. Referring to FIG. 3, when initially activated, block 205, the client application 108 automatically begins sending speed/location data 106 to the server 120. In some instances, as mentioned above, the client application 108 may request instructions from the server 120 regarding how frequently the speed location data 106 should be uploaded to the server 120. In some instances, the server 120 may instruct the mobile device 105 to obtain a new reporting interval after a period of time. For example, server 120 may instruct the mobile device 105 to report speed/location data 106 every minute and to check for a new reporting interval in ten minutes.

In block 210, the mobile device 105 initially determines whether to begin uploading send/location data 106 to the server 120. If the server 120 is not operative or did not did not indicate that the mobile device 105 should begin uploading speed/location data 108, the routine ends at block 299. If the server 120 indicates that the mobile device 105 should upload its speed/location data 106, the mobile device 105 immediately begins to upload speed/location data 106 in block 215. In block 220, the mobile device 105 periodically repeats the task of uploading the speed/location data 106 at the indicated reporting interval. If the mobile device 105 determines that it is time to check with the server 120 for a new reporting interval, routine 200 cycles back to block 205. As discussed further below, concurrently with the task of uploading speed/location data 106, the mobile device 105 may also be periodically receive traffic data in block 230 from the server 120 and presenting in block 235.

FIG. 3 illustrates data flow between the mobile device 105 and server 120 during the routine depicted in FIG. 2. Loading into the memory of the server 120 is a Traffic Pattern Recognition software program (called the "TPR program") 125 that collects and filters unwanted invalid speed/location data 106 from wanted, valid speed/location data 106. In various embodiments, the TPR program 125 is designed to handle thousands or even millions of data points with sub-second latency to filter out "noise" traffic data (e.g., vehicles entering or driving around in a parking lot). Server 120 may then sends the processed valid traffic data 150 back to the mobile devices 105 which is then displayed on the map interface. The traffic data 150 thereby provided may be real-time or near-real-time, may indicate an estimate of traffic speeds in miles (or kilometers) per hour (or other speed measure) in a road segment of roughly a couple hundred feet. In some embodiments, the provided traffic data may even be segregated by individual lane in a multi-lane road segment.

System Components

Figure 4:
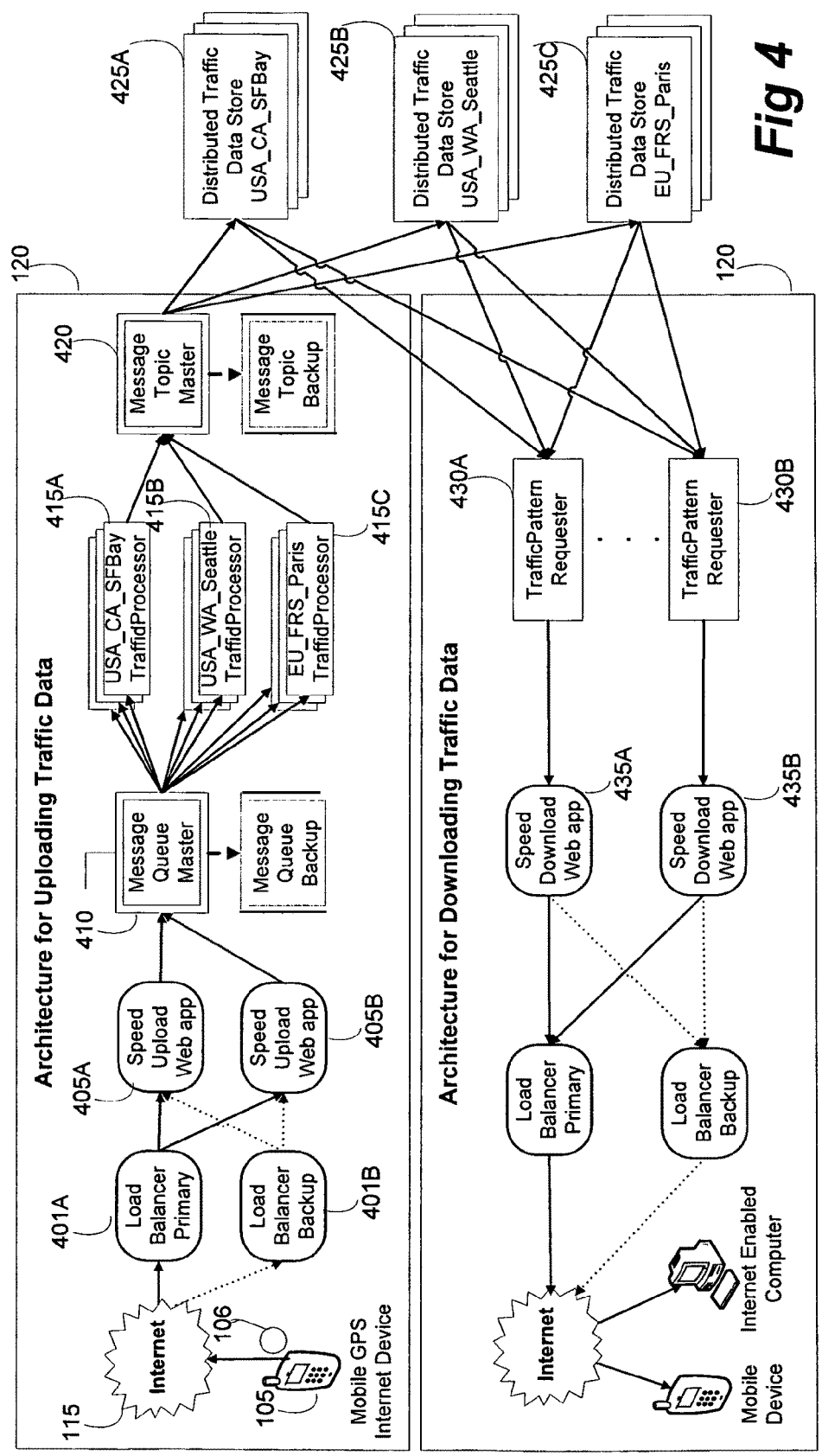
FIG. 4 is an illustrating of the components used to transmit traffic data from the mobile device and the components used to transmit specific traffic information to the mobile device.

FIG. 4 is a diagram illustrating various components used to upload the speed/location data 106 from a mobile device 105 to the server 120 and then to download processed traffic data 150 to the mobile device 105. In this embodiment, the client application 108 is a Java based program, however it should be understood the application may be written in other languages, environments, and/or frameworks.

Speed Upload Web app 405A-B, loaded into the server 120, is a Web application that handles HTTP requests called from client applications 108. When the mobile device 105 initially connects to the sever 120, the Web app 405A validates the uploaded speed data 106 and converts the uploaded speed data into a non-durable transient Java Messaging Service ("JMS") message and then passes the JMS message into a JMS queue. In other embodiments, a messaging system other than JMS may be employed, such as FUSE Message Broker.

In one embodiment, JMS Queue 410 queue is clustered with a backup queue to provide high availability. The JMS queue is responsible to deliver JMS messages to a traffic processor program that is associated with the geo-location of the speed/location data 106 received.

The traffic processors program, indicated by reference numbers 415A-C in FIG. 4 are JMS listeners designed to handle JMS messages to efficiently validate a speed/location data. Each traffic processor program 415A-C is designed to recognize speed data component in the speed/location data 106 only when it senses the mobile device has entered a speed monitoring area, such as a designated highway or a particular area. It does not track the location of the mobile devices 105 in non-monitoring areas, such as parking lots, cul-de-sacs or gas stations. A more detailed description of how the traffic processor program 415A-C filters the speed/location data 106 is discussed further below.

Each traffic processor program 415A-C is configured with a geo boundary for a specific geo-location. For example, the traffic processor program 415B of USA_WA_Seattle is set as: (48.0184, −122.7859) and (47.1785, −122.0004). For any speed/location data gathered within the boundary of USA_WA_Seattle, the speed/location data will be delivered to the Traffic Processor 415B of USA_WA_Seattle. For example, a speed data generated at location of latitude: 47.631330, longitude: −122.188568 will be delivered to the traffic processor program 415B of USA_WA_Seattle.

For validating a speed/location data, each traffic processor program 415A-B determines the traffic monitoring point ("TMP") for the speed/location data received. TMP is the traffic flow measurement segment. (See TMP Data Structure section for detail) After determining the TMP for the speed/location data, each traffic processor program 415A-C then calculates the average traffic speed using the new speed/location data and the previously collected speed/location data for the TMP. To efficiently calculate the average speed within a given time frame, the FastQueue data structure is implemented. (See FastQueue section for detail.) Once the average speed for the TMP is calculated, the traffic processor program 415A-C passes the average traffic speed information to the JMS topic 420.

To handle high volume of speed/location data and provide high availability for 24/7 uptime environment, the multiple traffic processor programs 415A-C may be clustered together for a specific region through the use of a JMS topic 420.

During operation, the mobile devices 105 are constantly or intermittently requesting and receiving traffic data 150 from the server 120. At least one Distributed Traffic Data Store database (three show and indicated by reference numbers 425A-C, is provided. Each Distributed Traffic Data Store database 425A-C is a JMS subscriber that is used to store the average traffic speed information, and to fetch traffic data for delivery to the mobile devices 105. Each Distributed Traffic Data Store database 425A-C is configured with a geo boundary for each region or metro area. To fetch the average traffic speed information efficiently, each Distributed Traffic Data Store database 425A-C is implemented with in-memory data cache to reduce the latency by eliminating slow file IO activities.

In one embodiment, the Distributed Traffic Data Store databases 425A-C uses Java Remote Method Invocation ("RMI") to reduce the network connection and invocation time to serve the traffic information request. They also have a background process to eliminate obsolete (timed-out) traffic information. To provide the linear scalability, multiple Distributed Traffic Data Store databases 425A-C may be clustered with a JMS topic 420 for each region or metro area.

During use, the mobile device 105 transmits a traffic request 160/. The traffic request 160 is converted by the traffic processor program into a Traffic Pattern Requester 430A-B which is a Java RMI client. The Traffic Pattern Requester 430A-B then retrieves the traffic information from the Distributing Traffic Data Store database 425 In one embodiment, Traffic Pattern Requester 430A-B uses a shared connection pool for RMI connection. In one embodiment, 430A-B uses a specially implemented R-tree data structure to find out IP address(es) and port number(s) for Distributed Traffic Data Store database 425A-C for requesting traffic information. For example, if the requested areas belongs multiple metro areas, Traffic Pattern Requester 430 aggregates the results from the multiple Distributed Traffic Data Store database 425.

If there are more than one Distributed Traffic Data Store databases 425 for one region or metro area, Traffic Pattern Requester 430 may use a load and balance algorithm to evenly distribute the usage of the Distributed Traffic DataStore databases 425.

Traffic Pattern Requester 430A-B compresses the returning traffic information based on the zoom level information submitted. By using a compressed format, the amount of information to be returned to the mobile device 105 is reduced. The Traffic Pattern Requester 430 combines a number of TMPs into one TMP when those TMPs are aligned with similar course direction (e.g., 10 degrees in one embodiment, or within 0-15 or more degrees). When the multiple TMPs are combined into one TMP, the average traffic speed from those combined TMPs are determined.

The zoom level is determined by the user of the mobile device 105 and determines the compression rate. For the higher zoom level, less compression is performed.

Speed Download Web application 435 handles HTTP requests called from the client applications 108 for retrieving real-time traffic information by calling Traffic Pattern Requestor 430 components. To handle the high volume of requests, Traffic Pattern Requestor 430 may be clustered though a load balancer as shown in FIG. 4.

Traffic Processor Detail

Figure 5:
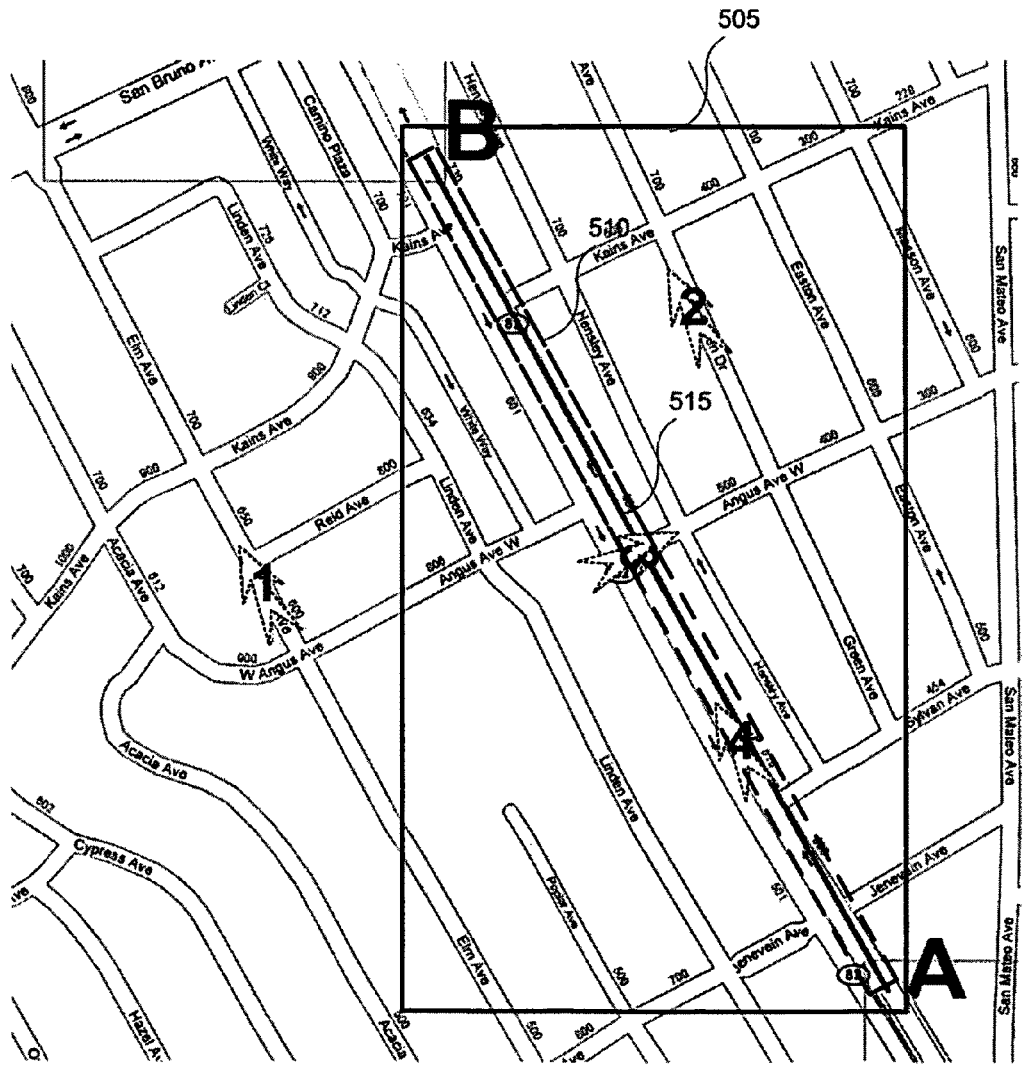
FIG. 5 is a diagram illustrating a Traffic Monitoring Point Data Structure Representation in accordance with one embodiment.

FIG. 5 is a diagram illustrating a Traffic Monitoring Point ("TMP") data structure accordance used by the system 100. The TMP data structure contains the number of TMP node points in a modified R-tree. R-trees are tree data structures that are similar to B-trees, but are used for spatial access methods i.e., for indexing multi-dimensional information; for example, the (X, Y) coordinates of geographical data. In one embodiment, a modified R-tree takes a geographical location (e.g., latitude and longitude) instead of a search rectangle as in a regular R-tree. For example, an R-tree may contain many TMP node points including 2 points corresponding labels, A and B, on the drawing below:

A. 3;37.352684275150544, −122.0128083229065
B. 3;37.354675658784835, −122.01626300811767

In FIG. 5, rectangular box 505 represents a Coarse Boundary. Narrow rectangular box 510 represents an Accurate Boundary. Arrows 1-5 represent the movement direction of GPS units (vehicles). The A and B labels represent the TMP node points. The straight line 515 is a TMP segment between two TMP node points (A and B). The TMP segment is the great circle distance, the shortest distance between any two points (A and B) on the surface of a sphere measured along a path on the surface of the sphere.

Traffic Pattern Recognition ("TPR") Process

Figure 6:
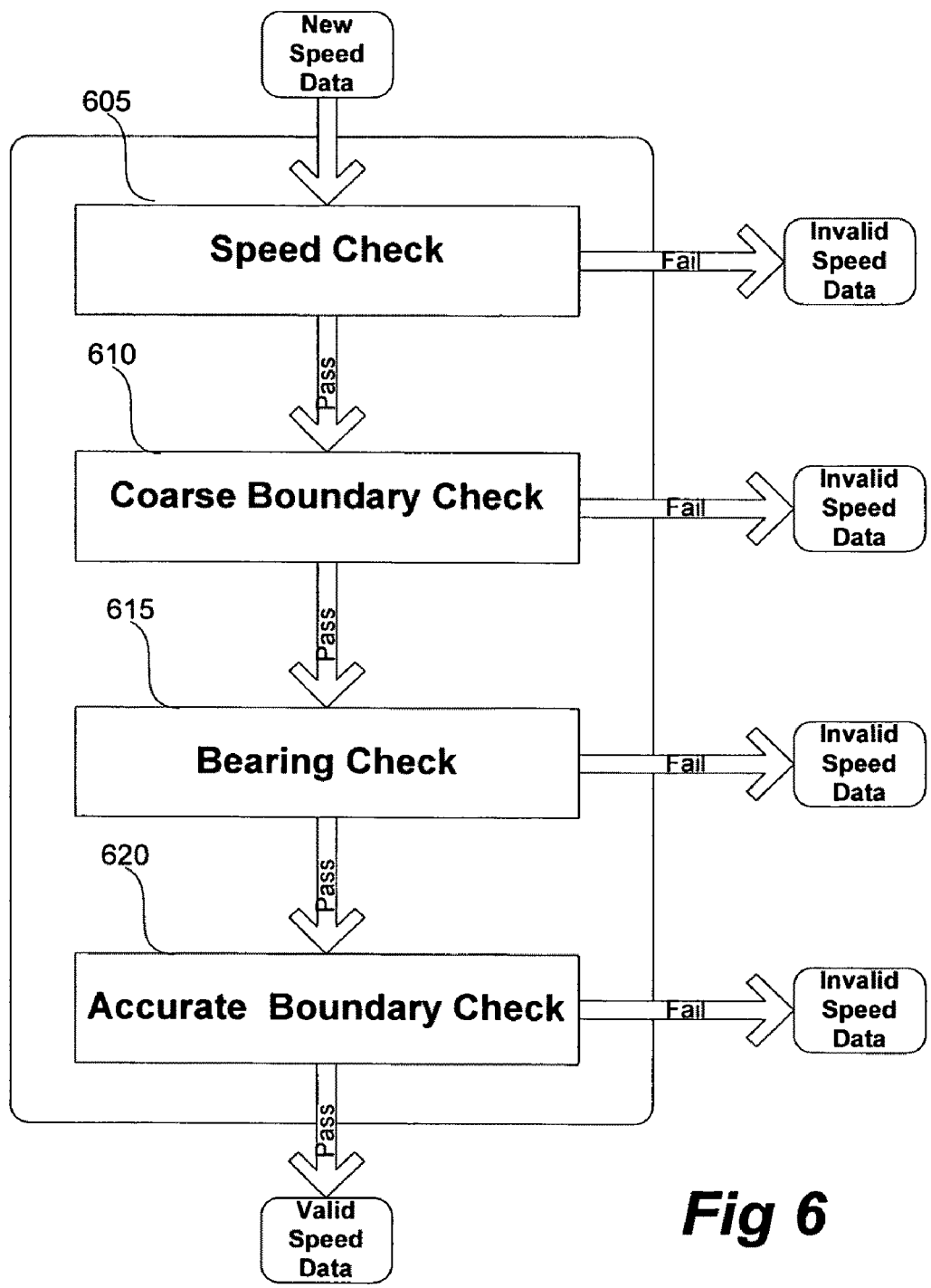
FIG. 6 is a diagram illustrating a Traffic Data Validation Filter Sequence.

FIG. 6 is a diagram illustrating a Traffic Data Recognition Filter Sequence.

Since a geo coordinate (latitude and longitude) of traffic data does not represent a rectangular XY coordinate, it requires relatively complex and expensive computation to calculate whether the indicated location is within valid monitoring street. To efficiently and accurately recognize valid traffic data and filter out unwanted traffic data, in one embodiment, TPR uses a filter chain process having the following steps: Speed Check 605; Coarse Boundary Check 610; Bearing Check 615; and Accurate Boundary Check 620.

Speed Check 605 is the first and least expensive check to determine whether a piece of speed/location data 106 is valid traffic data. If the reported speed is below a certain threshold based on the street type, then the information may be discarded, as it may represent a vehicle prowling for a parking spot. Similarly, Speed Check 605 may also filter out data generated by vehicles that are not traveling on the street, such as airplanes. Also, Speed Check 605 may filter out invalid traffic data incorrectly generated due to, for example, spurious GPS signals reflected by a building structure. In some embodiments, Speed Check 605 also uses the altitude of traffic data to validate the traffic data if the mobile device can provide the altitude information.

Coarse Boundary Check 610 determines whether the speed geo location belongs to one of node points in an R-tree data structure. This is very simple and efficient way to filter out invalid traffic data. For example, the traffic data labeled 1 on FIG. 5 would not be treated as valid traffic data because it does not belong to any TMP node point. However, other traffic data in FIG. 5, e.g., data labeled 2, 3 and 4, may still be valid traffic data, as sample traffic data 2-4 are within TMP Node 505.

The input to the R-tree Search Algorithm is a geo location (latitude and longitude). Searching is quite similar to searching in a B-tree. The search starts from the root node of the tree. Every internal node contains a set of rectangles and pointers to the corresponding child node and every leaf node contains the rectangles of spatial objects (the pointer to some spatial object can be there). For every rectangle in a node, it has to be decided if it overlaps the geo location or not. If yes, the corresponding child node has to be searched also. Searching is done like this in a recursive manner until all overlapping nodes have been traversed. When a leaf node is reached, the contained bounding boxes (rectangles) are tested against the geo location and their objects (if there are any) are put into the result set if they lie within the search rectangle.

Bearing Check 615 determines whether the movement direction of GPS (vehicle) unit is within an allowable margin of error, e.g., about 10 degrees, of the TMP segment direction. Bearing Check 615 allows marginal difference between the actual traffic bearing and TMP segment direction to accommodate, for example, the case that a vehicle changes a lane on the street.

Sample traffic data 2, 3, and 4 in FIG. 5 pass the Bearing Check 615. However, traffic data 3 fails Bearing Check 615 because the bearing of the speed data 3 is outside an allowable margin of error compared to the TMP segment bearing.

The Bearing Formula for two geo locations is calculated as follows:

$$\Delta long = long2 - long1$$

$$\text{Bearing } \varnothing = a \tan 2(\sin(\Delta long) \cdot \cos(lat2),$$

$$\cos(lat1) \cdot \sin(lat2) \cdot \sin(lat1) \cdot \cos(lat2) \cdot \cos(\Delta long))$$

Accurate Boundary Check 620 determines whether the speed geo location belongs to the TMP segment boundary. In one embodiment, this is the final process and the most computationally expensive process to validate the traffic data. In one embodiment, the speed data is considered valid traffic data of the cross-track distance (i.e. the distance of a point from a great-circle path, sometimes called cross-track error), is less than the lane width of the street.

In FIG. 5, sample traffic data 2 is an invalid traffic data because the cross-track distance is larger than the street lane width of TMP segment 515.

Referring again to FIG. 6, the Cross-track distance Formula as used in Accurate Boundary Check 620 is calculated as follows:

$$dxt = a \sin(\sin(dgcd/R) * \sin(\varnothing 1 - \varnothing 2)) * R$$

In the Cross-track distance Formula, dgcd is the Great Circle Distance from start point to third point; Ø1 is the (initial) bearing from start point to third point; Ø2 is the (initial) bearing from start point to end point; Ø is defined in Bearing Formula Equation 1 above, and, R is the earth's radius.

Great Circle Distance ($D_{GCD}$)

Let be the geographical latitude and longitude of two points (a base "standpoint" and the destination "fore point"), respectively, and their differences and the (spherical) angular difference/distance, or central angle, which can be constituted from the spherical law of cosines:

$$\Delta\hat{o} = \arccos(\cos \delta_s \cos \delta_f \cos \Delta\lambda + \sin \emptyset_s \sin \emptyset_f)$$

The distance d, i.e. the arc length, for a sphere of radius r and $\Delta\hat{o}$ given in radians, is then: $d = r\Delta\hat{o}$ However, the arccosine formula above is not normally used, as it can have large rounding rounding errors when the distance is small, as is often the case. Instead, an equation known historically as the haversine formula may be used, which is much more accurate for small distances:

$$\Delta\hat{\sigma} = 2\arcsin\left(\sqrt{\sin^2\left(\frac{\Delta\phi}{2}\right) + \cos\phi_s \cos\phi_f \sin^2\left(\frac{\Delta\lambda}{2}\right)}\right).$$

Historically, the use of this formula was simplified by the availability of tables for the haversine function: $\text{hav}(\emptyset) = \sin^2(\emptyset/2)$. Although this formula is accurate for most distances, it too suffers from rounding errors for the special (and somewhat unusual) case of antipodal points (on opposite ends of the sphere). A more complicated formula that is accurate for all distances is the following special case of the Vincenty formula (which more generally is a method to compute distances on ellipsoids):

$$\Delta\hat{\sigma} = \arctan\left(\frac{\sqrt{(\cos\phi_f \sin\Delta\lambda)^2 + (\cos\phi_s \sin\phi_f - \sin\phi_s \cos\phi_f \cos\Delta\lambda)^2}}{\sin\phi_s \sin\phi_f - \cos\phi_s \cos\phi_f \cos\Delta\lambda}\right).$$

When programming a computer, one should generally use the a tan 2( ) function rather than a tan( ), in order to simplify handling of the case where the denominator is zero.

If r is the great-circle radius of the sphere, then the great-circle distance is $r \Delta\hat{o}$. Note: as discussed above, "accuracy" refers to rounding errors only; all formulas themselves are exact (for a sphere).

Fastqueue

The Traffic Pattern Recognition ("TPR") process discussed above is designed to accurately calculate average traffic flow at a TMP segment. TPR averages the multiple traffic speeds belonging to the same TMP segment within the allowable time frame. To efficiently calculate the average speed for the multiple traffic data while invaliding timed out (stale) traffic data, various embodiments may use a Time box Fixed Size Fast Queue data structure, as discussed below. Time box Fixed Size Fast Queue is a fixed size queue recycling queue element slots for the timed out speed data. Time box Fixed Size Fast Queue quickly calculate the average traffic speed while invalidating time-out (stale) traffic speed data. The size of queue and expiration time-out settings is configurable.

Figure 7:
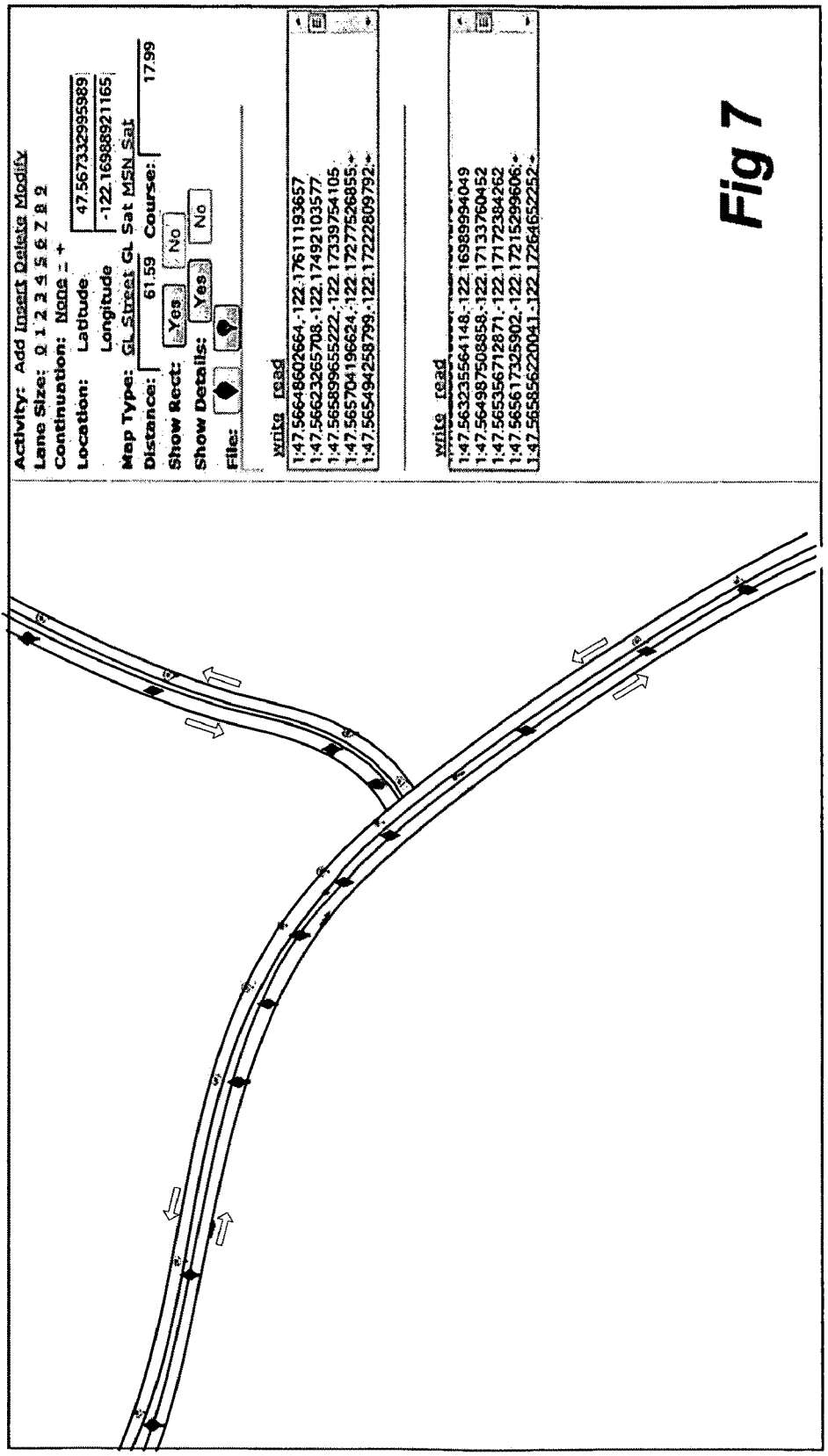
FIG. 7 depicts a Street Instrumentation Tool in accordance with one embodiment.

TimeboxFixedSizeFastQueuePseudo Code:
Add Element(intnewElement): average Speed
validateQueue( );
findNextIndex( );
validateQueue( ):void
invalidate expired (old) speed elements
find the first speed data index in the queue that is not expired
find the last speed data index in the queue that is not expired
findNextIndex( ):nextIndex
if the speed list is not full, return the last open slot index
if not, find the oldest speed data and return that index Street Instrument Process A street instrumentation tool extracts publicly available city street layout data and instruments them to TMPs. FIG. 7 depicts a GreenTraffic System Instrumentation Tool in accordance with one embodiment.

In one embodiment, the system instrumentation tool may generate output using syntax such as, "LaneSize; Latitude, Longitude [;OptionalContuation]", where OptionalContuation can be either '+' or '−'. OptionalContuation '+' is for carrying the traffic speed of previous TMP to the current TMP, while OptionalContuation '−' is for carrying the traffic speed of next TMP to the current TMP.

For example, the system instrumentation tool may generate output such as the following:
3;37.76496262181411, −122.40484401583672
3;37.76586186348071, −122.40483194589615;
+4;37.76783375341124, −122.40501970052719;

In one embodiment, an instrumentation conversion tool converts this simple input to the proprietary TMP data structure as:
BaseTMPInfo, NextTMPInfo; SpeedLocationInfo;
AllZoomLevelsTMPInfo [Para 85] The components of this data
structure are defined as set out below. BaseTMPInfo=
ZoomLevel, Bearing, NumOfLanes, Latitude, LatitudeMin,
LatitudeMax, Longitude, LongitudeMin, LongitudeMax
NextTMPInfo
=NextLatitude, NextLongitude AllZoomLevelsTMPInfo=
8ZoomLevelTMPInfo; 9ZoomLevelTMPInfo;
10ZoomLevelTMPInfo; 20ZoomLevelTMPInfo
8ZoomLevelTMPInfo=8:Latitude, Longitude, NextLatitude, NextLongitude
9ZoomLevelTMPInfo=9:Latitude, Longitude, NextLatitude, NextLongitude . . .
20ZoomLevelTMPInfo=20:Latitude, Longitude, NextLatitude, NextLongitude
Each ZoomLevelTMPInfo contains the zoom level and adjusted starting and endTMP locations. The adjusted TMP location is calculated to add the offset based on the corresponding zoom level so that the traffic flow lines don't overlap with opposite direction traffic flow lines.

For example, the TMP input "3;37.76496262181411, −122.40484401583672" may be converted to the following data structure:
8,0,3,377649626,377647926,377660318,−1224048440,
 −1224050140,−1224046619,377658618,
 −1224048319,0;L,377649578,−1224042765;A,
 377649615, −1224047191,377658607,
 −1224047070,377658628, −1224049567,377649636,−
 1224049688;8:377648078, −1223866863,377669426,
 −1223867239;9:377648855,−1223957651,377664025, -1223957779;10:377649241,-1224003045,
377661322,-1224003049;11:377649434,
-1224025742,377659970,-1224025684;
12:377649530,-1224037091,377659294,
-1224037001;13:377649578,-1224042765,
377658956,-1224042660;14:377649602,
-1224045602,377658787,-1224045489;
15:377649616,-1224047305,377658685,
-1224047187;16:377649621,-1224047872,
377658651,-1224047753;17:377649621,
-1224047872,377658651,-1224047753;
18:377649621,-1224047872,377658651,
-1224047753;19:377649621,-1224047872,
377658651,-1224047753;20:377649621,
-1224047872,377658651,-1224047753

The converted TMPs are compressed data structure used to recognize the accurate and real-time traffic pattern for a stream of massive traffic data at run time.

Figure 8:
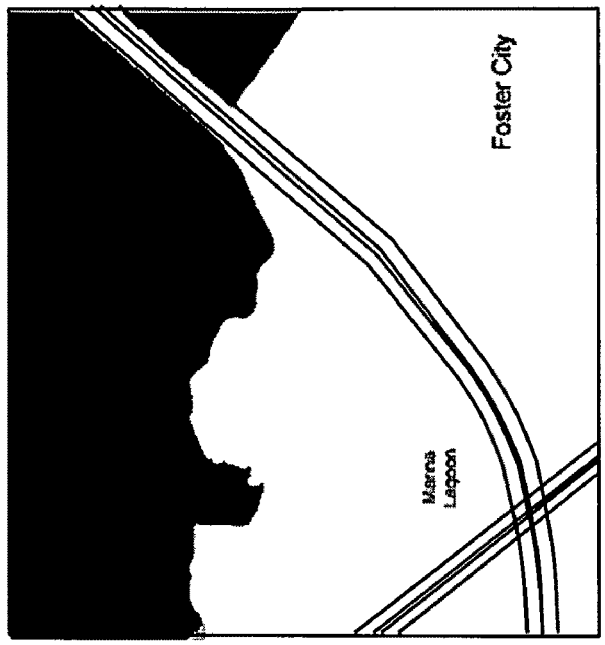
FIG. 8 is an example traffic flow illustrating two different zoom levels using adjusted Traffic Monitoring Point locations in accordance with one embodiment.
Figure 8:

FIG. 8 is an example traffic flow illustrating two different zoom levels using adjusted TMP locations.

Traffic Information Direction Filtering Process

Figure 9:
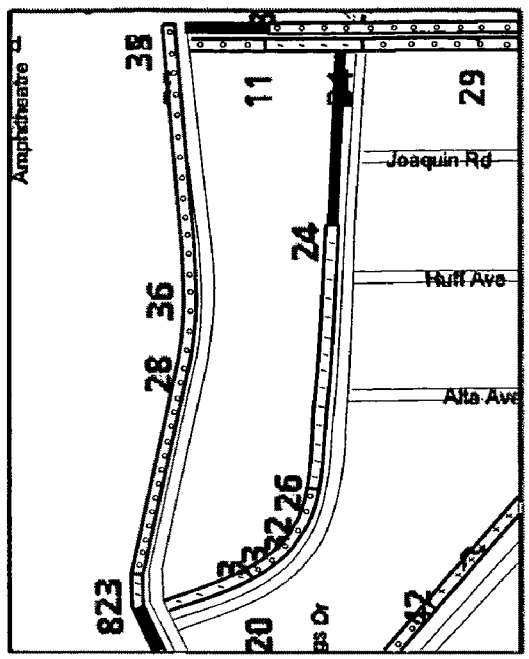
FIG. 9 is an example traffic flow illustrating for filtering traffic flow information by a travel direction in accordance with one embodiment.
Figure 9:
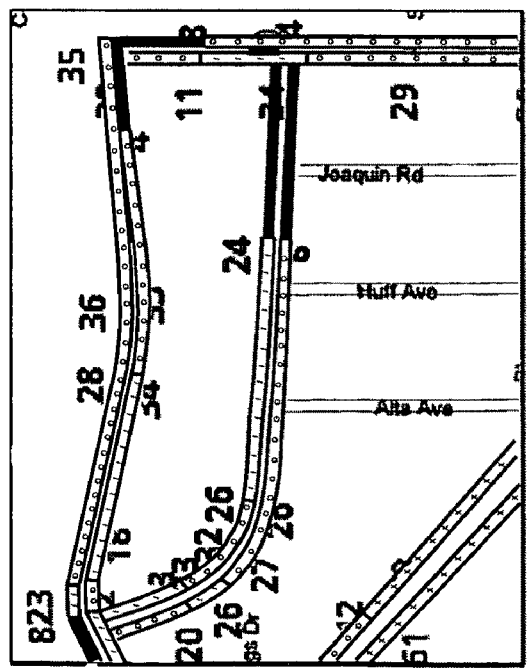

As illustrated in FIG. 9, the server 120 can filter out traffic information based on direction traveled. For example, when a commuter travels north, the server 120 can filter out traffic information for eastbound, westbound, and southbound traffic.

FIG. 10 is an illustration of the overall system showing the mobile device 105 with a client application 108 loaded therein communicating with the system sever 120 via a WAN 115. The mobile device 105 uploads speed/location data 108 to a traffic processor program 415 located in or coupled to the server 120. The traffic processor program 415 then uses a TMP database containing predetermined TMPs to build a Distribution Traffic Data Store database 425.

Also shown in FIG. 10 is a traffic request 160 shown being sent from the mobile device 105 to the server 120. In the traffic request, the boundary data and the zoom level are provided. The TRP software program 125 then processes the traffic request 160 and determines the TMP's within the request's boundary identifier and the zoom level. The applicable average speed data associated with the TMPs is then sent to the mobile device 105.

As discussed above, the user may determine the zoom level and thereby controls the amount of traffic data send to the user's mobile device.

Also, the user may attach a filter command to the traffic request limiting the traffic data along a future area to be travelled or to be monitored.

Additional Feature Set

Based on its knowledge of detailed, accurate, real-time traffic information, invarious embodiments, GreenTraffic system 100 may also provide some or all of the following additional features:

BestRoute—My best route based on actual segment speeds

CommuteTime—How long my commute will be, based on real time local traffic

LaunchTime—When to leave based on my calendar and current traffic information

SavingTracker—Show how much Co2, Time, and Money saved by taking an alternative route HelpMe Tracker—Emergency tracking system for when voice channel is full Although specific embodiments have been illustrated and described herein, it will be appreciated by those of ordinary skill in the art that a whole variety of alternate and/or equivalent implementations may be substituted for the specific embodiments shown and described without departing from the scope of the present invention. This application is intended to cover any adaptations or variations of the embodiments discussed herein.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A system for collecting information on traffic conditions, the system comprising: a traffic server for receiving speed, direction and location data from a plurality of GPS enabled mobile devices operating in traffic monitored region; a plurality of GPS enabled mobile devices used to send current speed, current direction, and current location data to said server; a traffic monitoring point database coupled to said server containing a plurality of traffic monitoring points in region; and, a traffic pattern recognition software program loaded into said server used to filter valid speed, direction and location data from invalid speed and location data uploaded from said mobile devices using a filter chain process that uses a speed check step, a coarse boundary check step, a bearing check step and an accurate boundary check step, said traffic pattern recognition software program stores speed data from valid speed/location data into a Distributed Traffic Data Store database containing the traffic monitoring point associated with said speed, direction and location data from said mobile devices and disregard invalid speed, direction and location data from said mobile devices.

2. The system as recited in claim 1, wherein said speed and location data is uploaded from said mobile devices at time intervals determined by the mobile device.

3. The system as recited in claim 1, wherein said speed and location data is uploaded from said mobile devices at time intervals determined by said server.

4. The system as recited in claim 1, further including a traffic request from said mobile device to said server requesting valid traffic data.

5. The system as recited in claim 1, wherein said traffic request includes a traffic map zoom level, a traffic map display boundary information so that only traffic monitoring points in said Distributed Traffic Data Store database and associated with said traffic monitor points within said traffic map display boundary are sent to said mobile device.

6. The system as recited in claim 1, further including said server being configured to process a traffic request from said mobile device to said server requesting valid traffic data.

7. The system as recited in claim 6, wherein said traffic request includes a traffic map display boundary so that only traffic monitoring points in said Distributed Traffic Data Store database and associated with said traffic monitor points within said boundary identifier are sent to said mobile device.

8. The system as recited in claim 7, wherein said speed, direction and location data is uploaded from said mobile devices at time intervals determined by said server.

9. A system for collecting real time traffic data and then transmitting the collected traffic information, comprising:
- a. a wireless communication network;
- b. plurality of GPS enabled mobile devices used to communicate with said wireless communication network and transmits speed, direction and location data thereto;
- c. a client side software program loaded into said mobile device used to transmit speed, direction and location data over said wireless communication network, said client side also used to produce a traffic request for traffic in a designated region;
- d. a server coupled to said wireless communication network,
- e. a traffic monitoring point database coupled to said server, said traffic monitoring point database containing a plurality of traffic monitoring points in a region where traffic is monitored;
- f. a traffic pattern recognition software program that uses a filter chain process loaded into said server, said filter chain process being used to filter said uploaded speed, direction, and location data from said mobile devices into valid and invalid data, said valid data being saved in a Distributed Traffic Data Store database containing a plurality of traffic monitoring points associated with the valid traffic data; and,
- g. a traffic pattern requestor program loaded into said server used to process traffic requests and transmit valid traffic speed data to said mobile devices, said traffic pattern requestor determines the traffic map display boundary information associated with each said traffic request from said mobile devices and then determines the traffic monitor points within said traffic map boundary information and sends the average speed value associated with each said traffic monitoring point to said mobile device.

10. The system for collecting real time traffic data and then transmitting the collected traffic information as recited in claim 9 further comprising said traffic pattern recognition program uses the traffic zoom level from said mobile devices to control the amount of traffic data downloaded to said mobile devices.

11. A method for automatically updating motor vehicle traffic information using a GPS enable device located within a motor vehicle operating in a traffic region containing a plurality of traffic monitoring points, the method comprising:

selecting a server coupled to a traffic monitoring point database containing a plurality of traffic monitoring points in a traffic region, said server includes a traffic pattern recognition software program loaded therein that filters said uploads speed, direction and location data from GPS enabled devices into valid and invalid data, said valid data being saved in a Distributed Traffic Data Store database, sending speed, direction and location data via a wireless network from a plurality of GPS enabled devices located in traffic moving within a traffic monitored region to said server;

determining the traffic monitoring point located at said traffic monitoring region associated with said speed, direction and location data;

filtering said speed and location information to determine whether said traffic monitoring point associated with said speed, direction and location data is found in said traffic monitoring database, said filtering being conducted using a filter chain process that uses a speed check step, a coarse boundary check step, a bearing check step and an accurate boundary check step, storing said speed data associated with said traffic monitoring point in said traffic monitoring database in said Traffic Data Store database;

determining the location of said GPS enabled device; and, sending speed data associated with said traffic monitoring points between said server and said GPS enabled device when said GPS enabled device is within a designated boundary containing said traffic monitoring points.

* * * * *